(12) United States Patent
Lin et al.

(10) Patent No.: US 12,381,047 B2
(45) Date of Patent: Aug. 5, 2025

(54) KEYBOARD AND KEY MODULE THEREOF

(71) Applicant: CHICONY ELECTRONICS CO., LTD., New Taipei (TW)

(72) Inventors: Chun-Ting Lin, New Taipei (TW); Chun-Wei Chien, New Taipei (TW); Lyu-Cyuan Zeng, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 96 days.

(21) Appl. No.: 18/358,497

(22) Filed: Jul. 25, 2023

(65) Prior Publication Data

US 2024/0266125 A1  Aug. 8, 2024

(30) Foreign Application Priority Data

Feb. 8, 2023  (TW) ................. 112104476

(51) Int. Cl.
*H01H 13/10* (2006.01)
*F21V 8/00* (2006.01)
(Continued)

(52) U.S. Cl.
CPC ........... *H01H 13/10* (2013.01); *G02B 6/0091* (2013.01); *H01H 13/023* (2013.01); *H01H 13/14* (2013.01); *H01H 2219/062* (2013.01); *H01H 2221/044* (2013.01); *H01H 2221/056* (2013.01); *H01H 2221/066* (2013.01)

(58) Field of Classification Search
CPC ........... H01H 2013/00; H01H 2013/02; H01H 2013/50; H01H 2013/52; H01H 2215/00; H01H 2215/004; H01H 2231/00; H01H 2231/002; H01H 2233/00; H01H 2233/008; H01H 2233/03; H01H 2233/018; H01H 2219/062; H01H 2221/044; H01H 2221/056; H01H 2221/066; H01H 3/00; H01H 3/02; H01H 3/12; H01H 2003/00; H01H 2003/02; H01H 2003/12; H01H 13/00; H01H 13/10; H01H 13/023; H01H 13/14; H01H 13/26; H01H 13/28; H01H 13/285; H01H 13/30; H01H 13/50; H01H 13/52; H01H 13/70; H01H 13/72;
(Continued)

(56) References Cited

U.S. PATENT DOCUMENTS

| | | | |
|---|---|---|---|
| 10,134,543 B2 | 11/2018 | Lin | |
| 2009/0128496 A1* | 5/2009 | Huang | G06F 3/0202 345/170 |
| 2019/0228930 A1 | 7/2019 | Lin | |

FOREIGN PATENT DOCUMENTS

| | | | |
|---|---|---|---|
| CN | 116344250 A | * | 6/2023 |
| TW | 411003 U | | 11/2000 |

(Continued)

*Primary Examiner* — Anthony R Jimenez
(74) *Attorney, Agent, or Firm* — MUNCY, GEISSLER, OLDS & LOWE, P.C.

(57) ABSTRACT

A keyboard includes a circuit board module and a key module. The key module includes a keycap, a connecting seat, a connecting assembly and an elastic member. The connecting seat is disposed on the circuit board module. The connecting seat has an opening. One end of the connecting assembly connects to the keycap, and the other end connects to the connecting seat. The elastic member is disposed in the opening of the connecting seat, and the connecting seat presses against the elastic member.

18 Claims, 10 Drawing Sheets

(51) Int. Cl.
 *H01H 13/02* (2006.01)
 *H01H 13/14* (2006.01)
(58) Field of Classification Search
 CPC ............. H01H 13/705; H01H 2221/00; G02B 6/0091; F21V 8/00
 USPC ........................................................ 200/314
 See application file for complete search history.

(56) References Cited

FOREIGN PATENT DOCUMENTS

| | | |
|---|---|---|
| TW | 200529048 A | 9/2005 |
| TW | M561842 U | 6/2018 |
| TW | 201837947 A | 10/2018 |

\* cited by examiner

KEYBOARD AND KEY MODULE THEREOF

BACKGROUND

1. Technical Field

The present disclosure relates to a key module, and particularly to a key module of the keyboard.

2. Description of the Related Art

At present, from the perspective of computer usage habits, keyboards are indispensable input devices. The main structures of the keyboard comprise a circuit board, a base plate and a plurality of key structures. The base plate is disposed on the circuit board. The circuit board has a plurality of switches respectively corresponding to the key structures. The base plate has a plurality of hooks to connect the key structures respectively. Each the key structures further comprises a keycap, a connecting assembly (e.g., scissor-type connecting assembly) and an elastic member.

During assembly, it is necessary to place the elastic members of each key structure on the circuit board and ensure that they correspond to the respective switches on the circuit board. After one end of the connecting assembly is assembled with the keycap, the other end is then assembled with the hook on the base plate. As described above, a keyboard has a considerable number of component parts and the assembly process is quite complicated, indicating that there is room for improvement. In addition, the frequency of use of each key structure on the keyboard varies, resulting in different replacement times for each key structure. The current key structures are not easily replaceable by users, so when some key structures are damaged, users often choose to replace the entire keyboard, which is inconvenient and not environmentally friendly.

SUMMARY

In view of the aforesaid drawbacks of the prior art, it is an objective of the disclosure to provide a keyboard and a key module thereof, wherein the novel structure of the key module is used to solve the cumbersome assembly process of a conventional keyboard and key structure thereof.

To achieve the above and other objectives, the disclosure provides a keyboard, which comprises a circuit board module and a key module. The key module comprises a keycap, a connecting seat, a connecting assembly and an elastic member. The connecting seat is disposed on the circuit board module. The connecting seat comprises an opening. One end of the connecting assembly connects to the keycap, and the other end connects to the connecting seat. The elastic member is disposed in the opening of the connecting seat, and the connecting seat presses against the elastic member.

To achieve the above object, the disclosure further provides a key module, which is applied to a keyboard. The keyboard comprises a circuit board module. The key module comprises a keycap, a connecting seat, a connecting assembly and an elastic member. The connecting seat is disposed on the circuit board module and comprises an opening. One end of the connecting assembly connects to the keycap, and the other end connects to the connecting seat. The elastic member is disposed in the opening of the connecting seat, and the connecting seat presses against the elastic member.

According to an embodiment of the disclosure, the connecting seat further comprises a holding portion located on the periphery of the opening and extending into the opening. The holding portion presses against the elastic member.

According to an embodiment of the disclosure, the elastic member is a dome structure. The holding portion presses against a bottom periphery of the elastic member.

According to an embodiment of the disclosure, the connecting seat further comprises a first fixing portion located on the periphery of the opening. The elastic member further comprises a second fixing portion located on an outer side of the elastic member. The first fixing portion and the second fixing portion are mutually matched and connected.

According to an embodiment of the disclosure, the connecting seat is disposed on the circuit board module by adhesive or engagement.

According to an embodiment of the disclosure, the connecting seat further comprises at least two first positioning portions, and the circuit board module further comprises at least two second positioning portions. The at least two first positioning portions and the at least two second positioning portions are mutually matched.

According to an embodiment of the disclosure, the connecting seat further comprises a disassembly groove, which is located on a surface of the connecting seat facing the circuit board module and located on a side wall of the connecting seat.

According to an embodiment of the disclosure, the circuit board module comprises a membrane circuit board. The membrane circuit board comprises a membrane top layer, a membrane space layer and a membrane bottom layer. Further, the hardness of the membrane bottom layer is higher than those of the membrane top layer and the membrane space layer.

According to an embodiment of the disclosure, the membrane bottom layer is a fiberglass board.

According to an embodiment of the disclosure, the circuit board module comprises a light source disposed on the membrane bottom layer.

According to an embodiment of the disclosure, the circuit board module comprises a light guide plate. The light guide plate is disposed above the membrane circuit board.

According to an embodiment of the disclosure, the circuit board module comprises a masking plate. The masking plate is disposed above the light guide plate.

According to an embodiment of the disclosure, the circuit board module comprises a printed circuit board. The elastic member is a carbon black rubber dome.

According to an embodiment of the disclosure, the circuit board module comprises a light source disposed on the printed circuit board.

According to an embodiment of the disclosure, the circuit board module comprises a light guide plate. The light guide plate is disposed above the printed circuit board.

In continuation of the description above, the keyboard comprises the key module, and the key module comprises a keycap, a connecting seat, a connecting assembly and an elastic member. The elastic member is disposed in the opening of the connecting seat, and the connecting seat presses against the elastic member. Further, one end of the connecting assembly connects to the keycap, and the other end connects to the connecting seat. With the aforementioned structure, the key module forms an independent member. During assembly of the keyboard, the connecting seat of the key module can simply be placed on the circuit board module to complete the assembly of the key module, which is quite convenient. In addition, if certain keys on the keyboard are damaged, the aforementioned connection means makes it easier to replace individual key modules, rather than having to replace the entire keyboard. This is also environmentally friendly.

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 1:
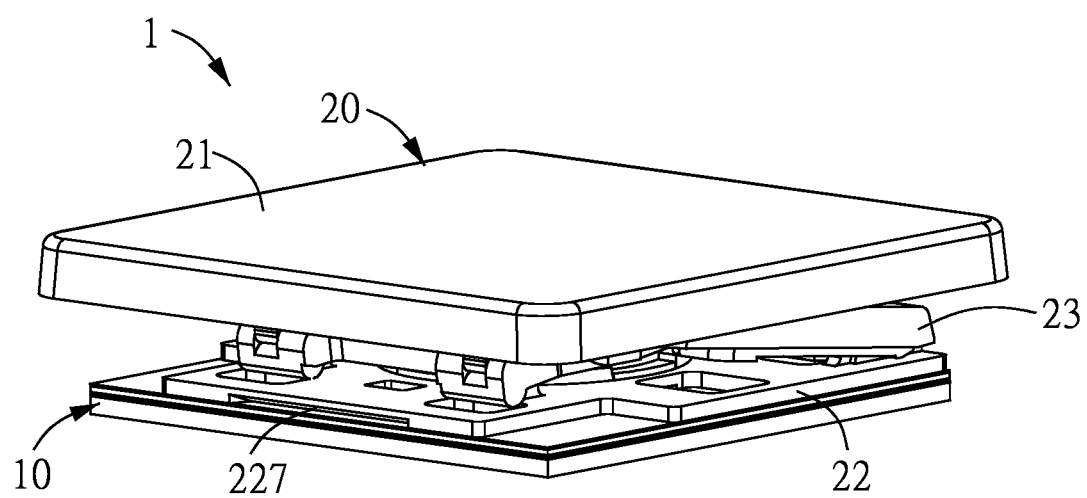
FIG. 1 is a schematic diagram of a keyboard according to the first embodiment of the disclosure.
Figure 2:
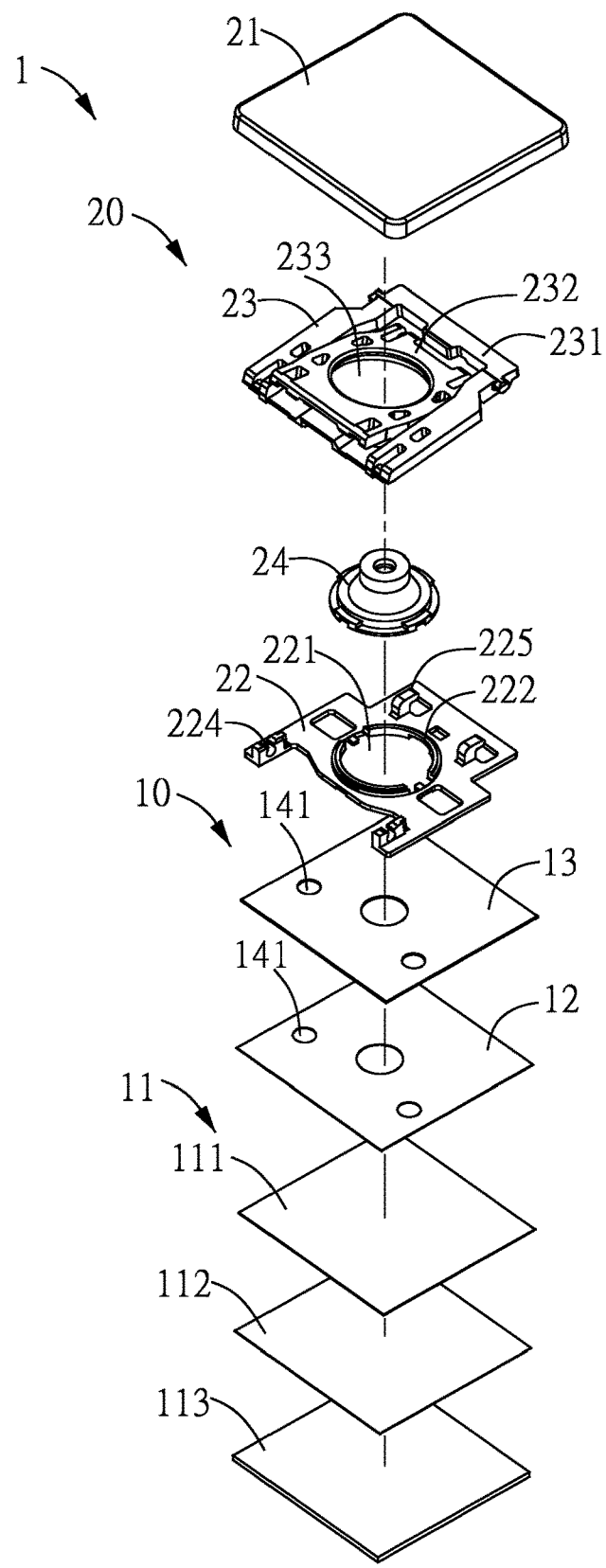
FIG. 2 is an exploded schematic diagram of the keyboard shown in FIG. 1.
Figure 3:
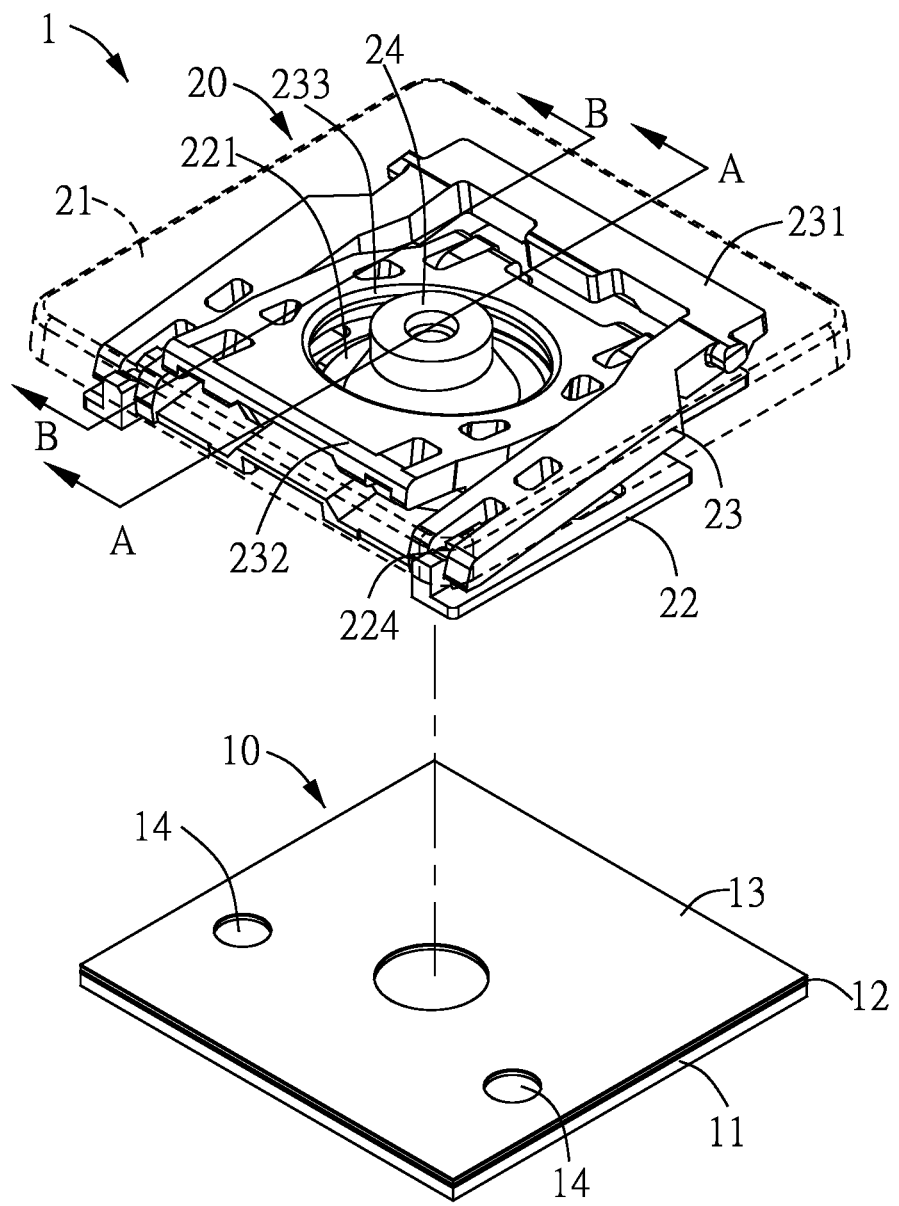
FIG. 3 is an exploded schematic diagram of a circuit board module and a key module shown in FIG. 1.

Please refer to FIG. 1, FIG. 2 and FIG. 3. FIG. 1 is a schematic diagram of a keyboard according to the first embodiment of the disclosure; FIG. 2 is an exploded schematic diagram of the keyboard shown in FIG. 1; and FIG. 3 is an exploded schematic diagram of a circuit board module and a key module shown in FIG. 1. In this embodiment, the keyboard 1 comprises a circuit board module 10 and at least one key module 20. The key module 20 is disposed on the circuit board module 10. It should be noted that FIG. 1 FIG. 2 and FIG. 3 only show the scope of one key module 20 and its corresponding circuit board module 10. In this embodiment, the key module 20 comprises a keycap 21, a connecting seat 22, a connecting assembly 23 and an elastic member 24. The key module 20 is formed as a standalone member by first assembling the connecting seat 22 with the connecting assembly 23 and the elastic member 24, and then assembling the connecting assembly 23 with the keycap 21, as shown in FIG. 3.

Figure 4:
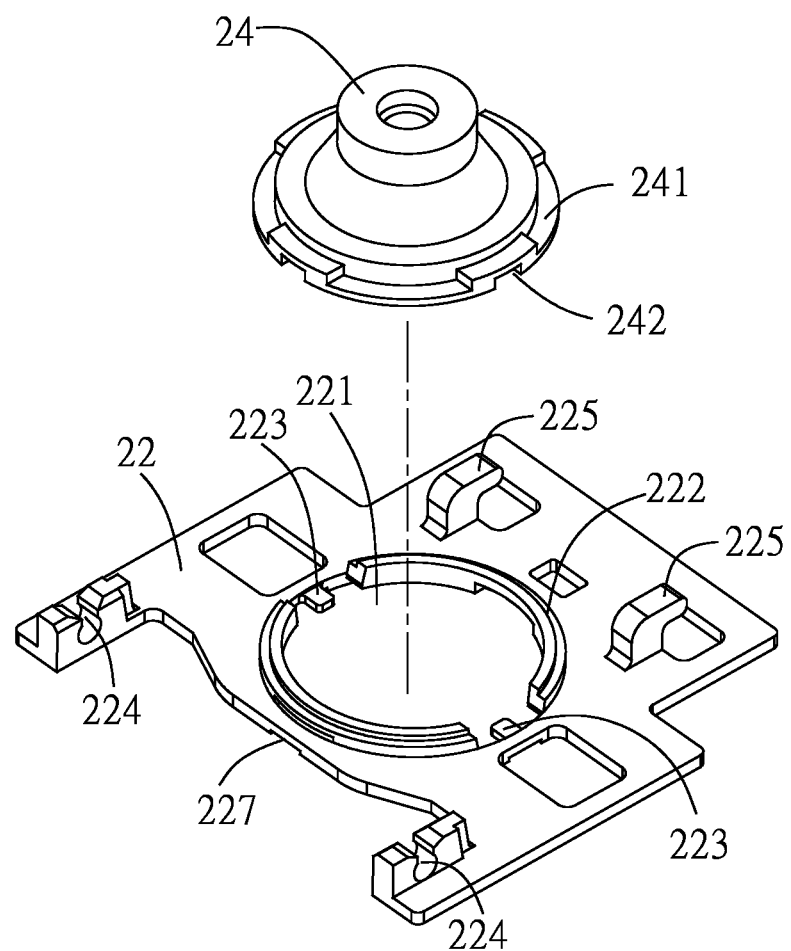
FIG. 4 is an enlarged view of a connecting seat and an elastic member shown in FIG. 2.
Figure 5:
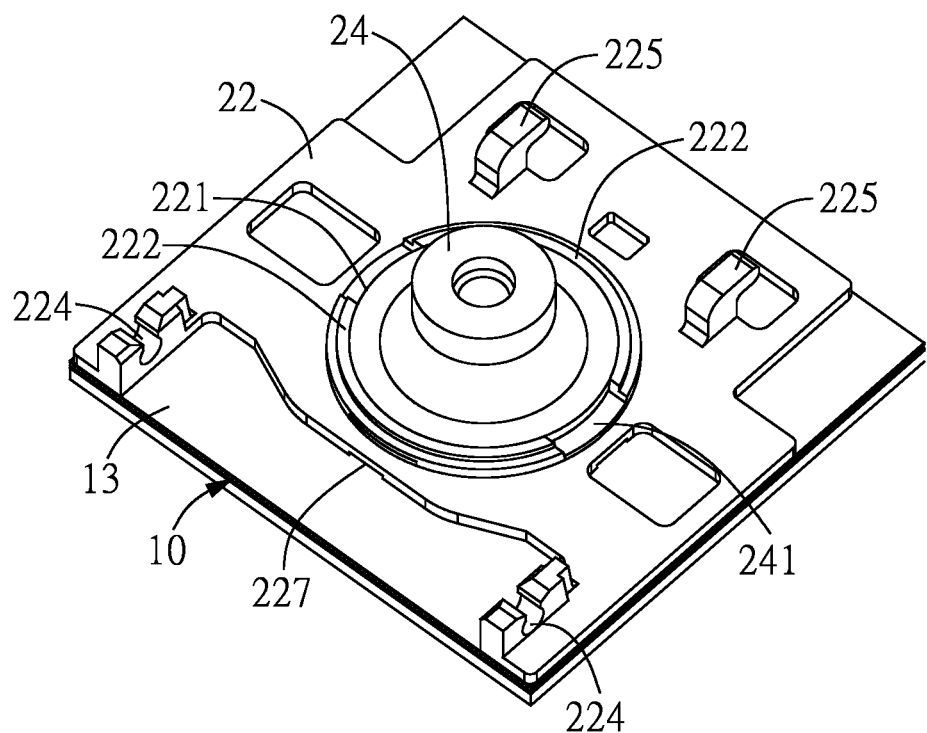
FIG. 5 is a schematic diagram of the circuit board module, the connecting seat and the elastic member shown in FIG. 1.

The following describes of the connection relationship between the connecting seat 22 and the elastic member 24. Please refer to FIG. 2, FIG. 3, FIG. 4, and FIG. 5 simultaneously. FIG. 4 is an enlarged view of a connecting seat and an elastic member shown in FIG. 2, and FIG. 5 is a schematic diagram of the circuit board module, the connecting seat and the elastic member shown in FIG. 1. In this embodiment, the connecting seat 22 comprises an opening 221, and the elastic member 24 is disposed in the opening 221 of the connecting seat 22. Further, the connecting seat 22 presses against the elastic member 24 such that the elastic member 24 can be restricted within the opening 221. After the key module 20 is assembled, one end of the elastic member 24 comes into contact with the bottom of the keycap 21, providing an elastic force for the keycap 21 to return to its original position. The elastic member 24 of this embodiment is a dome structure and is made of rubber. In another embodiment, the elastic member 24 may be a spring, a metal spring or a metal dome; the present disclosure is not limited thereto.

Preferably, the connecting seat 22 of this embodiment further comprises a holding portion 222, which is located on the periphery of the opening 221 and extends into the opening 221. In other words, the holding portion 222 is a protruding structure that extends from the periphery of the opening 221 towards its center. When the elastic member 24 is accommodated in the opening 221, the holding portion 222 presses against a bottom periphery 241 of the elastic member 24. Specifically, the holding portion 222 presses against the upper surface of the bottom periphery 241 (i.e., the surface of the bottom periphery 241 facing the keycap 21). Thus, the arrangement of the holding portion 222 can prevent the elastic member 24 from detaching from the opening 221 facing the keycap 21.

Preferably, the connecting seat 22 further comprises a first fixing portion 223. The first fixing portion 223 is also disposed on the periphery of the opening 221 and extends into the opening 221. Correspondingly, the elastic member 24 further comprises a second fixing portion 242, which is mutually matched with first fixing portion 223. Specifically, the first fixing portion 223 and the second fixing portion 242 are mutually matched, which means that the position and configuration of the first fixing portion 223 correspond to those of the second fixing portion 242. For example, the first fixing portion 223 is located on the periphery of the opening 221, and the second fixing portion 242 is located on the outer side of the elastic member 24. Further, the second fixing portion 242 is located on the bottom periphery 241. Regarding the configuration, in this embodiment, the first fixing portion 223 is a protruding structure extending into the opening 221. Correspondingly, the second fixing portion 242 is a groove structure. Thus, when the elastic member 24 is disposed in the opening 221 of the connecting seat 22, the first fixing portion 223 (i.e., the protruding structure) can be directly accommodated in the second fixing portion 242 (i.e., the groove structure), thereby fixing together the first fixing portion 223 and the second fixing portion 242. In this embodiment, the first fixing portion 223 is located on the lower surface of the bottom periphery 241 (i.e., the surface of the bottom periphery 241 facing the circuit board module 10) to prevent the elastic member 24 from detaching from the opening 221 facing the circuit board module 10. In another embodiment, the first fixing portion 223 may be a groove structure, and the second fixing portion 242 may a protruding structure, correspondingly. Alternatively, the first fixing portion 223 and the second fixing portion 242 could be other compatible structures, and the present disclosure is not limited thereto.

Figure 6:
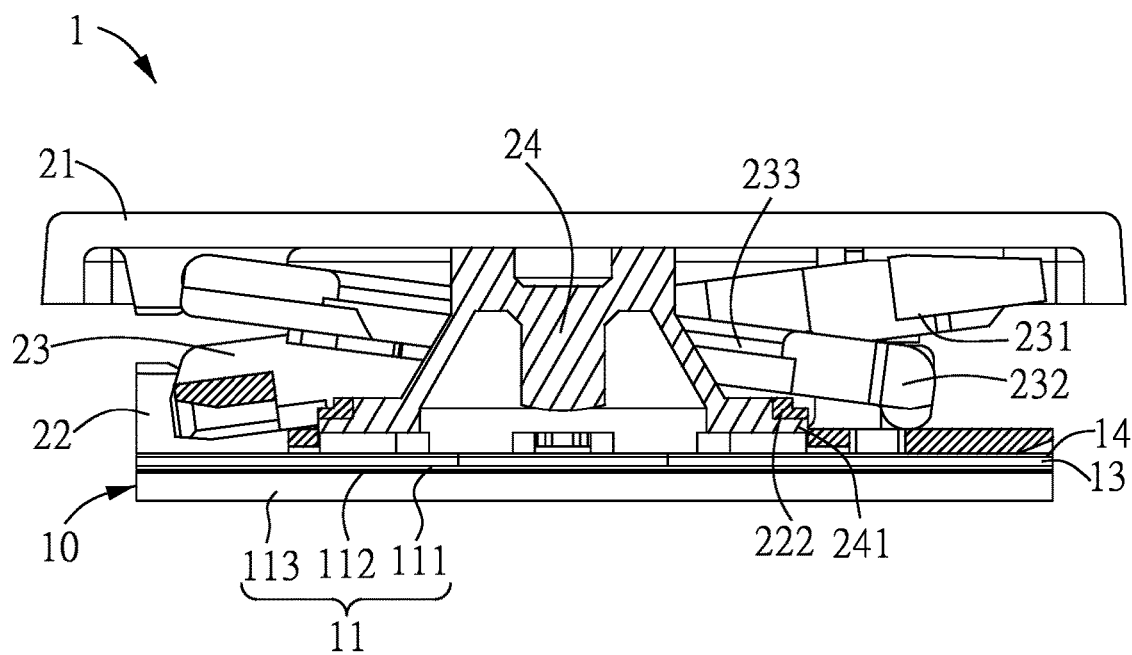
FIG. 6 is a sectional view of along the A-A side of the key module shown in FIG. 3.
Figure 7:
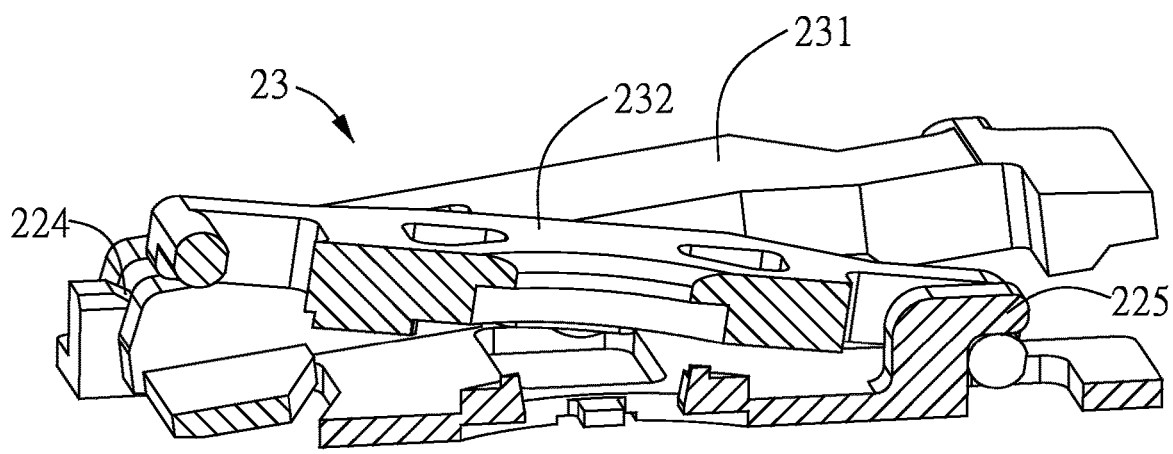
FIG. 7 is a sectional view of along the B-B side of the key module shown in FIG. 3.

Next, the following describes the connection relationships between the connecting seat 22 and the connecting assembly 23, as well as the connection relationships between the connecting assembly 23 and the keycap 21. Please refer to FIG. 2, FIG. 3, FIG. 6, and FIG. 7 simultaneously. FIG. 6 is a sectional view of along the A-A side of the key module shown in FIG. 3; FIG. 7 is a sectional view of along the B-B side of the key module shown in FIG. 3. One end of the connecting assembly 23 connects to the keycap 21, and the other end connects to the connecting seat 22. Specifically, the connecting assembly 23 of this embodiment comprises an outer frame 231 and an inner frame 232, which are pivotally connected to each other. One end of the outer frame 231 and one end of the inner frame 232 each connects to the keycap 21, while the other ends connect to the connecting seat 22. In this embodiment, the connecting seat 22 comprises a first connection portion 224 and a second connection portion 225. The first connection portion 224 connects to one end of the outer frame 231, and the second connection portion 225 connects to one end of the inner frame 232.

Specifically, the first connection portion 224 may be, for example, a droplet-shaped hole, and the second connection portion 225 may be, for example, a hook. One end of the outer frame 231 connects to the first connection portion 224 of the connecting seat 22. For example, one end of the outer frame 231 has a rod portion, which is inserted into the droplet-shaped hole (i.e., the first connection portion 224).

Preferably, the inner frame 232 also has an opening 233, which corresponds in position to the opening 221 of the connecting seat 22. The opening 233 of the inner frame 232 is also used to accommodate the elastic member 24 such that the top surface of the elastic member 24 can contact the bottom of the keycap 21.

By the aforementioned structures, the outer frame 231 and the inner frame 232 can collectively drive the keycap 21 to move upward and downward relative to the connecting seat 22, and the elastic member 24 can provide the keycap 21 with elastic force to return to its original position. Regarding the connection between the scissor-type connecting assembly (e.g., the connecting assembly 23) and the keycap 21, as well as the resulting up-and-down movement, both techniques are common knowledge to those skilled in the art and will not be further described here. In another embodiment, the connecting assembly 23 may also be a connecting rod or a telescoping sleeve. It only needs to allow the keycap 21 to move upward and downward relative to the connecting seat 22, and the present invention is not limited thereto.

The elastic member 24 is disposed in the opening 221 of the connecting seat 22, and one end of the connecting assembly 23 connects to the keycap 21 while the other end connects to the connecting seat 22 such that the key module 20 can be formed as an independent member, as shown in FIG. 3. During assembly of the keyboard 1, it is only necessary to place the connecting seat 22 of the key module 20 onto the circuit board module 10 to complete the assembly of one key module 20. When the key module 20 is disposed on the circuit board module 10, the opening 221 of the connecting seat 22 allows the bottom of the elastic member 24 to contact the circuit board module 10 and to trigger the switch (not shown in the figures) of the circuit board module 10.

The connecting seat 22 is disposed on the circuit board module 10 by various means, which may be but are not limited to adhesive or engagement. In this embodiment, the connecting seat 22 is disposed on the circuit board module 10 by adhesive. Please refer to FIG. 2 and FIG. 6. In this embodiment, the circuit board module 10 comprises a membrane circuit board 11. The membrane circuit board 11 comprises a membrane top layer 111, a membrane space layer 112 and a membrane bottom layer 113. The hardness of the membrane bottom layer 113 is higher than those of the membrane top layer 111 and the membrane space layer 112. In this embodiment, the membrane bottom layer 113 may be a fiberglass board. Specifically, the membrane bottom layer 113 may be made of a fiberglass composite material, such as fiberglass board FR-4, which is a rigid board. Preferably, the thickness of the membrane bottom layer 113 is greater than those of the membrane top layer 111 and the membrane space layer 112 so as to provide the membrane bottom layer 113 with greater strength to support the key module 20. In this embodiment, the key module 20 is supported by the membrane bottom layer 113 made of fiberglass board FR-4 material, which replaces the metal base plate of the conventional keyboard. This achieves the benefits of reducing the number of components, lowering costs, reducing weight, and simplifying the assembly process.

Preferably, the circuit board module 10 further comprises a light source (not shown in the figures) so that the keyboard 1 can be used as an illuminating keyboard. The light source may be but is not limited to a light emitting diode (LED), and the light source could be disposed on the membrane bottom layer 113. Preferably, the circuit board module 10 of this embodiment further comprises a light guide plate 12. The light guide plate 12 is disposed above the membrane circuit board 11 to receive the light emitted from the light source and evenly distribute the light. Preferably, the circuit board module 10 further comprises a masking plate 13. Further, the masking plate 13 is disposed above the light guide plate 12, to allow the light to be transmitted towards the direction of the keycap 21.

It should be noted that the figures in this embodiment do not show the light source. The reason is that the circuit board module 10 has the light guide plate 12, which uniformly transmits light emitted from the light source, allowing the light source to be placed away from the key module 20. In another embodiment, the circuit board module 10 can also have a number of light sources corresponding to the number of keys of the key module 20, allowing the light from each light source to be directly transmitted to each keycap 21. In this configuration, it is possible to choose whether or not to use the light guide plate 12 depending on the actual needs.

Figure 8:
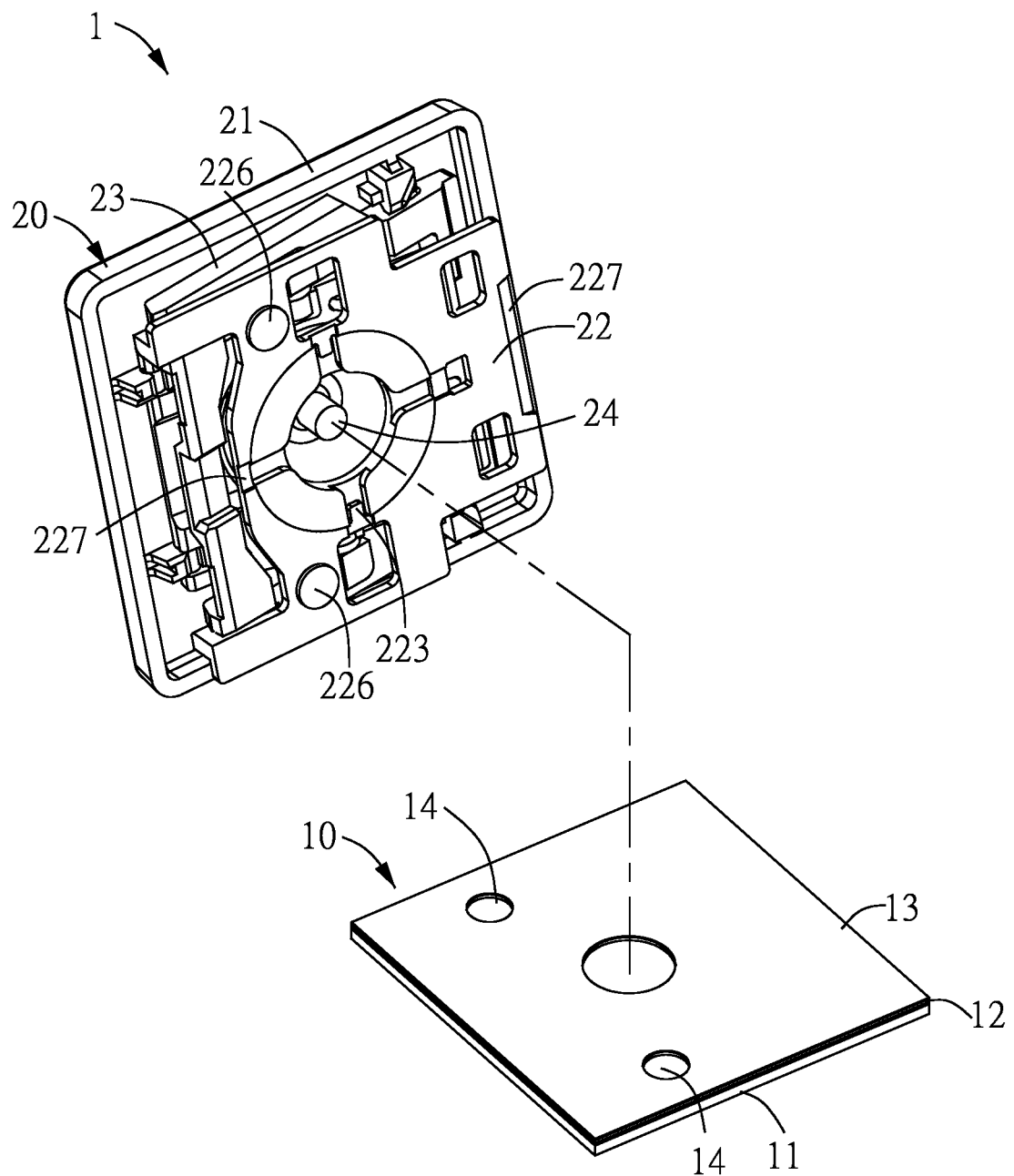
FIG. 8 is a schematic diagram of the bottom side of the circuit board module and the key module shown in FIG. 3.

Preferably, the connecting seat 22 further comprises at least two first positioning portions 226, as shown in FIG. 8. FIG. 8 is a schematic diagram of the bottom side of the circuit board module and the key module shown in FIG. 3. Please refer to FIG. 2 and FIG. 8. Correspondingly, the circuit board module 10 further comprises at least two second positioning portions 14. Furthermore, the first positioning portions 226 and the second positioning portions 14 are mutually matched, which means that the position and configuration of the first positioning portions 226 correspond to those of the second positioning portions 14. For example, in this embodiment, the first positioning portions 226 are positioning columns, while the second positioning portions 14 are corresponding positioning holes. Preferably, in this embodiment, the second positioning portions 14 is disposed on the light guide plate 12 and the masking plate 13 of the circuit board module 10. Specifically, the light guide plate 12 and the masking plate 13 respectively form two holes 141 (as shown in FIG. 4). When the masking plate 13 is disposed above the light guide plate 12, the holes 141 of the light guide plate 12 and the masking plate 13 together form two positioning holes (i.e., the second positioning portions 14, as shown in FIG. 5 and FIG. 8).

Additionally, in this embodiment, during the assembly of the key module 20 to the circuit board module 10, adhesive can be applied to either the bottom side of the connecting seat 22 or the upper surface of the masking plate 13. Next, the two positioning columns (i.e., the first positioning portions 226) are respectively disposed in the two positioning holes (i.e., the second positioning portions 14) to ensure the relative position of the circuit board module 10 and the key module 20, and to secure the circuit board module 10 and the key module 20 with the adhesive. In another embodiment, the first positioning portions 226 can be positioning holes, while the second positioning portions 14 can be the corresponding positioning columns. Alternatively, the first positioning portions 226 and the second positioning portions 14 may be other structures that are mutually compatible, and the present disclosure is not limited thereto.

Please refer FIG. 1, FIG. 4 and FIG. 8. Preferably, the connecting seat 22 further comprises a disassembly groove 227. The disassembly groove 227 is disposed on the bottom side of the connecting seat 22 (i.e., the surface facing the circuit board module 10) and is located on the side wall of the connecting seat 22. When the key module 20 is to be replaced, the user can easily do it by inserting a flat object into the disassembly groove 227 and applying force toward the keycap 21, at which point the connecting seat 22 can be separated from the circuit board module 10, allowing the key module 20 to be removed for replacement.

Figure 9:
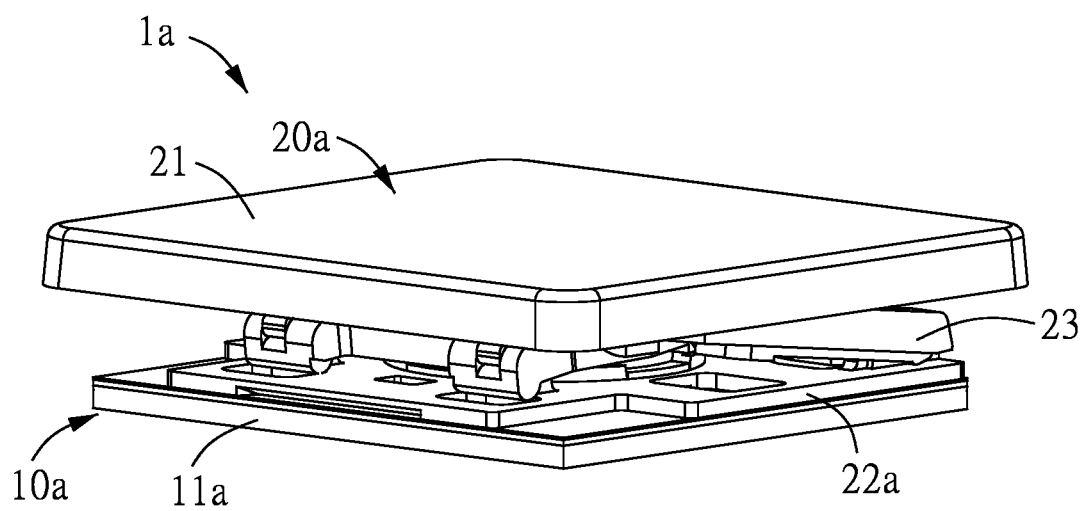
FIG. 9 is a schematic diagram of a keyboard according to the second embodiment of the disclosure.
Figure 10:
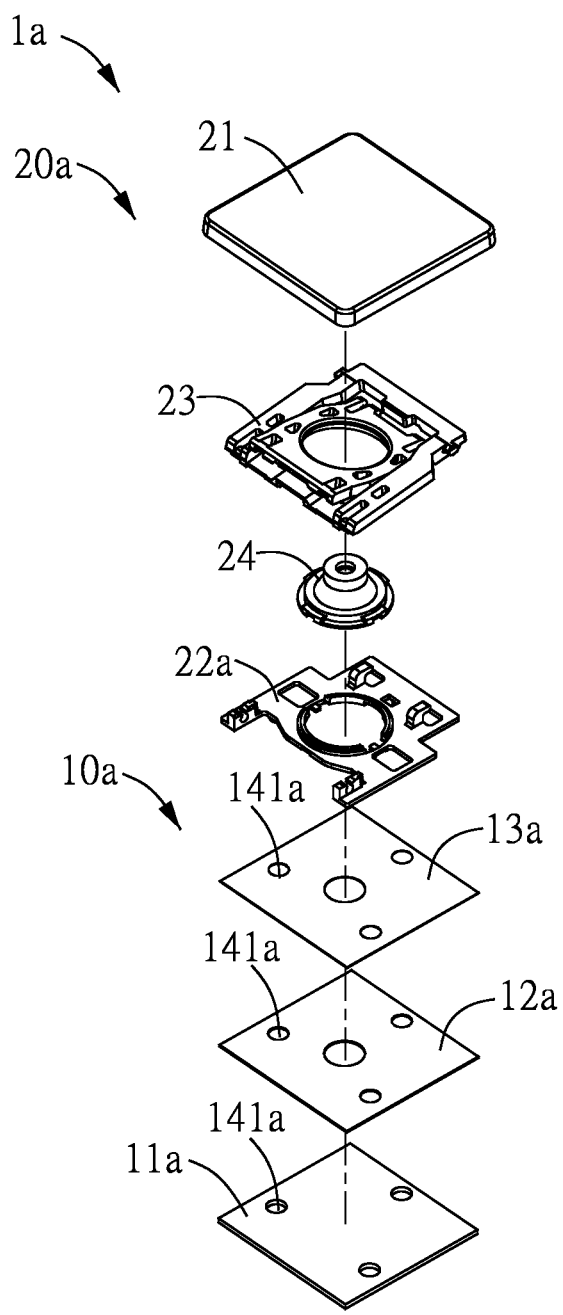
FIG. 10 is an exploded schematic diagram of the keyboard shown in FIG. 9.
Figure 11:
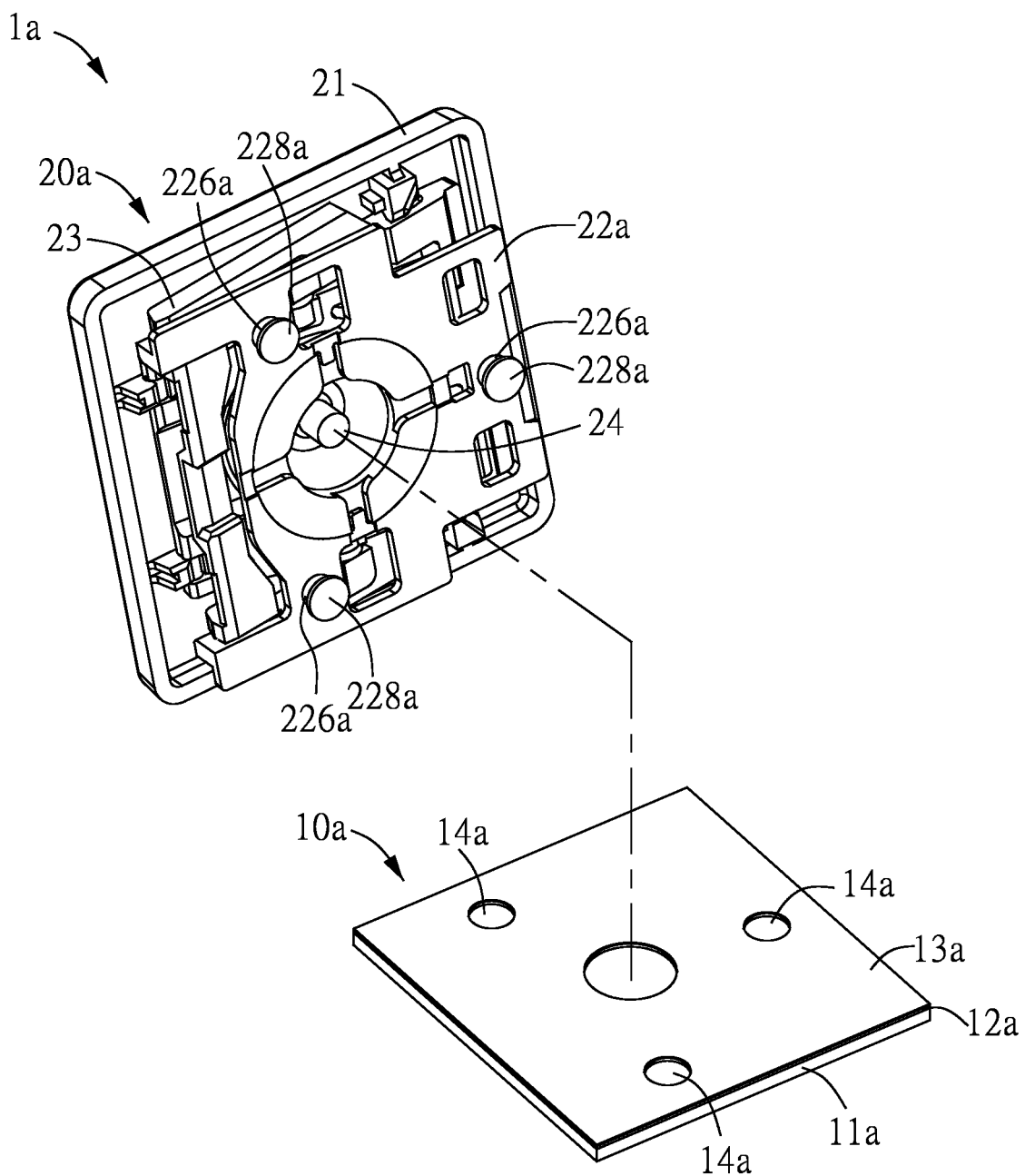
FIG. 11 is an exploded schematic diagram of a circuit board module and a key module shown in FIG. 9.

Please refer to FIG. 9, FIG. 10 and FIG. 11. FIG. 9 is a schematic diagram of a keyboard according to the second embodiment of the disclosure; FIG. 10 is an exploded schematic diagram of the keyboard shown in FIG. 9; and FIG. 11 is an exploded schematic diagram of a circuit board module and a key module shown in FIG. 9. In this embodiment, the keyboard 1a also comprises a circuit board module 10a and a key module 20a. The key module 20a is also disposed on the circuit board module 10a. Further, the key module 20a also comprises a keycap 21, a connecting seat 22a, a connecting assembly 23 and an elastic member 24. The key module 20a of this embodiment is disposed on the circuit board module 10a through engagement. As a result, the structures on the bottom side of the connecting seat 22a (i.e., the surface facing the circuit board module 10a) differ from those in the second embodiment and require the use of different reference numerals. Because the structures and connections of other elements (e.g., the keycap 21, the connecting assembly 23 and the elastic member 24) are the same as in the first embodiment, they are denoted by the same reference numerals. In other words, the connection relationships between the connecting seat 22a, the connecting assembly 23 and the elastic member 24, as well as the connection relationships between the connecting assembly 23 and the keycap 21, can all be referred to in the first embodiment and will not be further described below.

The circuit board module 10a of this embodiment is different from the circuit board module 10 in the first embodiment. For example, the circuit board module 10a of this embodiment comprises a printed circuit board 11a. That is, in this embodiment, the circuit board module 10a is formed by using the printed circuit board 11a, which differs from the membrane circuit board 11 used in the first embodiment. The printed circuit board 11a includes a metal substrate with a harder material. The elastic member 24 is also a dome structure, preferably a carbon black rubber dome.

In this embodiment, the keyboard 1a can also be used as an illuminating keyboard. Correspondingly, the circuit board module 10a comprises a light source (not shown in the figures), which is disposed on the printed circuit board 11a. Similarly, the circuit board module 10a further comprises a light guide plate 12a and a masking plate 13a. The light guide plate 12a is disposed above the printed circuit board 11a. The masking plate 13a is disposed above the light guide plate 12a, and the masking plate 13a is located on the surface of the light guide plate 12a facing the key module 20a.

In this embodiment, the connecting seat 22a comprises three first positioning portions 226a, which are the positioning columns. Each of the first positioning portions 226a has an engaging portion 228a. The engaging portion 228a is a protruding structure located on the end of the first positioning portions 226a. That is, an outer edge of the engaging portion 228a is greater than that of the first positioning portions 226a such that the engaging portion 228a is a protruding structure with a greater diameter than the first positioning portions 226a. Correspondingly, the circuit board module 10a comprises three second positioning portions 14a, which are mutually matched with the first positioning portions 226a. Specifically, in this embodiment, each of the second positioning portions 14a is a positioning hole. For the purpose of securing the key module 20a in place, the second positioning portions 14a of this embodiment are located on the printed circuit board 11a, the light guide plate 12a, and the masking plate 13a. Specifically, the printed circuit board 11a, the light guide plate 12a and the masking plate 13a each form three holes 141a (as shown in FIG. 10) to jointly form three positioning holes (i.e., the second positioning portions 14a, as shown in FIG. 11).

In this embodiment, the inner edges of the holes 141a located on the printed circuit board 11a are larger than the outer edges of the engaging portions 228a. The inner edges of the holes 141a located on the light guide plate 12a and the masking plate 13a are smaller than the outer edges of the engaging portions 228a, and preferably, they are equal to the edges of the first positioning portions 226a. During assembly of the key module 20a to the circuit board module 10a, the engaging portion 228a can be accommodated in the holes 141a on the printed circuit board 11a, and the first positioning portions 226a are positioned in the holes 141a on the light guide plate 12a and the masking plate 13a. Thus, the light guide plate 12a can limit the position of the engaging portion 228a, thereby engaging the key module 20a with the circuit board module 10a. In other words, the structures of the first positioning portions 226a, the engaging portion 228a and the second positioning portions 14a can achieve the dual functions of positioning and securing simultaneously. Preferably, the first positioning portions 226a and the engaging portions 228a can made of soft materials for ease of assembly into the positioning holes (i.e., the second positioning portions 14a).

In another embodiment, the inner edges of the three holes 141a on the printed circuit board 11a, the light guide plate 12a and masking plate 13a are all smaller than the outer edges of the engaging portions 228a. Thus, during assembly of the key module 20a onto the circuit board module 10a, the engaging portions 228a can be inserted through the positioning holes (i.e., the second positioning portions 14a) to position the engaging portions 228a on the bottom side of the printed circuit board 11a, thereby engaging the key module 20a with the circuit board module 10a.

In another embodiment, the printed circuit board 11a can be replaced with the membrane circuit board 11 as in the first embodiment, and the holes are formed on the membrane top layer 111, the membrane space layer 112 and the membrane bottom layer 113, and they can also be engaged with the engaging portion 228a of the connecting seat 22a; the present disclosure is not limited thereto. In another embodiment, the circuit board module 10a may not have the light guide plate 12a and the masking plate 13a, while the holes 141a are only formed on the printed circuit board 11a as the second positioning portions 14a, which can also achieve the function of mutual engagement. The present disclosure is not limited thereto.

As described above, the keyboard comprises the key module, and the key module comprises a keycap, a connecting seat, a connecting assembly and an elastic member. The elastic member is disposed in the opening of the connecting seat, and the connecting seat presses against the elastic member. Further, one end of the connecting assembly connects to the keycap, and the other end connects to the connecting seat. With the aforementioned structure, the key module forms an independent member. During assembly of the keyboard, the connecting seat of the key module can simply be placed on the circuit board module to complete the assembly of the key module, which is quite convenient. In addition, if certain keys on the keyboard are damaged, the aforementioned connection means makes it easier to replace individual key modules, rather than having to replace the entire keyboard. This is also environmentally friendly.

Although the present disclosure has been explained in relation to its preferred embodiments, it is to be understood that many other possible modifications and variations can be made without departing from the spirit and scope of the disclosure as hereinafter claimed.

What is claimed is:

1. A keyboard, comprising:
    a circuit board module; and
    a key module, comprising:
        a keycap;
        a connecting seat disposed on the circuit board module and comprising an opening and a holding portion, the holding portion located on a periphery of the opening and extending into the opening;
        a connecting assembly, having one end connecting to the keycap and the other end connecting to the connecting seat; and
        an elastic member disposed in the opening of the connecting seat, and wherein the holding portion of the connecting seat presses against the elastic member.

2. The keyboard as claimed in claim 1, wherein the elastic member is a dome structure, and the holding portion presses a bottom periphery of the elastic member.

3. The keyboard as claimed in claim 1, wherein the connecting seat further comprises a first fixing portion located on the periphery of the opening, the elastic member further comprises a second fixing portion located on an outer side of the elastic member, and the first fixing portion and the second fixing portion are mutually matched and connected.

4. The keyboard as claimed in claim 1, wherein the connecting seat further comprises at least two first positioning portions, the circuit board module further comprises at least two second positioning portions, and the at least two first positioning portions and the at least two second positioning portions are mutually matched.

5. The keyboard as claimed in claim 1, wherein the connecting seat further comprises a disassembly groove disposed on a surface of the connecting seat facing the circuit board module and located on a side wall of the connecting seat.

6. The keyboard as claimed in claim 1, wherein the circuit board module further comprises a membrane circuit board, which comprises a membrane top layer, a membrane space layer and a membrane bottom layer, and the hardness of the membrane bottom layer is higher than those of the membrane top layer and the membrane space layer.

7. The keyboard as claimed in claim 6, wherein the membrane bottom layer is a fiberglass board.

8. The keyboard as claimed in claim 6, wherein the circuit board module comprises a light source disposed on the membrane bottom layer.

9. The keyboard as claimed in claim 8, wherein the circuit board module comprises a light guide plate disposed above the membrane circuit board.

10. The keyboard as claimed in claim 9, wherein the circuit board module comprises a masking plate disposed above the light guide plate.

11. The keyboard as claimed in claim 1, wherein the circuit board module comprises a printed circuit board, and the elastic member is a carbon black rubber dome.

12. The keyboard as claimed in claim 11, wherein the circuit board module comprises a light source disposed on the printed circuit board.

13. The keyboard as claimed in claim 12, wherein the circuit board module comprises a light guide plate disposed above the printed circuit board.

14. A key module, applied to a keyboard comprising a circuit board module, the key module comprising:
    a keycap;
    a connecting seat disposed on the circuit board module and comprising an opening and a holding portion, the holding portion located on a periphery of the opening and extending into the opening;
    a connecting assembly, having one end connecting to the keycap and the other end connecting to the connecting seat; and
    an elastic member disposed in the opening of the connecting seat, and wherein the holding portion of the connecting seat presses against the elastic member.

15. The key module as claimed in claim 14, wherein the elastic member is a dome structure, and the holding portion presses a bottom periphery of the elastic member.

16. The key module as claimed in claim 14 wherein the connecting seat further comprises a first fixing portion located on the periphery of the opening, the elastic member further comprises a second fixing portion located on an outer side of the elastic member, and the first fixing portion and the second fixing portion are mutually matched and connected.

17. The key module as claimed in claim 14, wherein the connecting seat further comprises at least two first positioning portions, the circuit board module further comprises at least two second positioning portions, and the two first positioning portions and the two second positioning portions are mutually matched.

18. The key module as claimed in claim 14, wherein the connecting seat further comprises a disassembly groove disposed on a surface of the connecting seat facing the circuit board module and located on a side wall of the connecting seat.

* * * * *